US008295770B2

(12) United States Patent  
Seil et al.

(10) Patent No.: US 8,295,770 B2  
(45) Date of Patent: Oct. 23, 2012

(54) ELECTRICAL ACCESSORY AND METHOD OF PROVIDING SAME

(75) Inventors: Oliver Duncan Seil, Pasadena, CA (US); Kelly Ferdman, Los Angeles, CA (US); Steve Lane, Orange, CA (US); Chad DeJong, Los Angeles, CA (US); Abraham Camacho, West Hollywood, CA (US)

(73) Assignee: Belkin International, Inc., Playa Vista, CA (US)

( * ) Notice: Subject to any disclaimer, the term of this patent is extended or adjusted under 35 U.S.C. 154(b) by 962 days.

(21) Appl. No.: 12/349,505

(22) Filed: Jan. 6, 2009

(65) Prior Publication Data

US 2009/0186583 A1 Jul. 23, 2009

Related U.S. Application Data

(63) Continuation-in-part of application No. 11/842,921, filed on Aug. 21, 2007, now Pat. No. 7,930,004, and a continuation-in-part of application No. 11/248,762, filed on Oct. 11, 2005, now Pat. No. 7,734,256.

(51) Int. Cl.  
*H04B 7/00* (2006.01)

(52) U.S. Cl. .................... 455/41.3; 455/41.2; 455/569.2

(58) Field of Classification Search ............... 455/569.2, 455/569.1, 345, 41.2, 41.3  
See application file for complete search history.

(56) References Cited

U.S. PATENT DOCUMENTS

D85,176 S   9/1931  Garretson  
D244,360 S  5/1977  Van Kersen  
D317,579 S  6/1991  Shalvi  
5,230,563 A  7/1993  Shalvi  
D357,201 S  4/1995  Novack  
(Continued)

FOREIGN PATENT DOCUMENTS

WO   WO 2004 008649    1/2004  
(Continued)

OTHER PUBLICATIONS

Search Report from PCT/US2010/046093, 15 pages, Nov. 4, 2010.

(Continued)

*Primary Examiner* — Lewis West  
(74) *Attorney, Agent, or Firm* — Bryan Cave LLP (57) ABSTRACT

Some embodiments disclose an electrical accessory configured to transmit one or more first data signals from a first electrical device to a receiving device. The electrical accessory is also configured to transmit second data signals to the first electrical device. The first electrical device can include a first electrical connector and a second electrical connector. The electrical accessory can include: (a) a power acquisition unit configured to receive electrical power from an external power source; (b) a first electrical interface electrically coupled to the power acquisition unit and configured to mechanically and electrically couple to the first connector to provide the electrical power to the first electrical device; (c) a second electrical interface configured to mechanically and electrically couple to the second connector, the second electrical interface is configured to transmit the second data signals to the first electrical device and to receive the first data signals from the first electrical device; (d) a transmittal mechanism electrically coupled to the second electrical interface and configured to provide the first data signals to the receiving device; and (e) a first microphone electrically coupled to the second electrical interface and configured to receive sounds and convert the sounds into the second data signals. Other embodiments are disclosed in this application.

30 Claims, 7 Drawing Sheets

U.S. PATENT DOCUMENTS

| | | | |
|---|---|---|---|
| 5,642,402 A | 6/1997 | Vilmi et al. | |
| D381,662 S | 7/1997 | Weissberg et al. | |
| 5,769,369 A | 6/1998 | Meinel | |
| 5,860,824 A | 1/1999 | Fan | |
| 5,967,851 A | 10/1999 | Ozer et al. | |
| 6,052,603 A | 4/2000 | Kinzalow et al. | |
| 6,075,999 A | 6/2000 | Vilmi et al. | |
| D435,580 S | 12/2000 | Grinkus | |
| 6,377,825 B1 * | 4/2002 | Kennedy et al. | 455/569.2 |
| D462,022 S | 8/2002 | Luebke et al. | |
| D463,990 S | 10/2002 | Wysocki | |
| D473,207 S | 4/2003 | Tanio | |
| 6,591,085 B1 | 7/2003 | Grady | |
| D479,712 S | 9/2003 | Ng | |
| 6,636,749 B2 * | 10/2003 | Holmes et al. | 455/569.2 |
| D483,281 S | 12/2003 | Cobigo | |
| D487,470 S | 3/2004 | Cobigo | |
| D487,735 S | 3/2004 | Wu et al. | |
| 6,728,375 B1 | 4/2004 | Palett et al. | |
| D489,696 S | 5/2004 | Cho | |
| D489,713 S | 5/2004 | Yusa | |
| D495,665 S | 9/2004 | Stekelenburg | |
| D496,638 S | 9/2004 | Deubler, Jr. | |
| D496,639 S | 9/2004 | Deubler, Jr. | |
| D498,219 S | 11/2004 | Hamann | |
| D500,484 S | 1/2005 | Deguchi | |
| 6,842,356 B2 | 1/2005 | Hsu | |
| D506,989 S | 7/2005 | Seil et al. | |
| D508,028 S | 8/2005 | Deubler, Jr. | |
| D510,046 S | 9/2005 | Li | |
| D510,584 S | 10/2005 | Tierney | |
| D515,058 S | 2/2006 | Boyd | |
| 7,006,851 B2 * | 2/2006 | Holmes et al. | 455/569.2 |
| D521,526 S | 5/2006 | Suckle et al. | |
| D525,962 S | 8/2006 | Elson | |
| D526,990 S | 8/2006 | Slevin et al. | |
| D527,666 S | 9/2006 | Tal et al. | |
| D547,223 S | 7/2007 | Tal et al. | |
| D548,728 S | 8/2007 | Yoshiyama | |
| D555,146 S | 11/2007 | Sandy | |
| D561,703 S | 2/2008 | Shimokawa et al. | |
| D561,730 S | 2/2008 | Deubler et al. | |
| 7,338,328 B2 | 3/2008 | Krieger et al. | |
| D572,230 S | 7/2008 | Neu et al. | |
| D578,993 S | 10/2008 | Yamada et al. | |
| D590,804 S | 4/2009 | Tkachuk | |
| D593,062 S | 5/2009 | Lee et al. | |
| D597,068 S | 7/2009 | Whang | |
| D600,228 S | 9/2009 | Finney et al. | |
| D609,683 S | 2/2010 | Li | |
| 7,930,004 B2 * | 4/2011 | Seil et al. | 455/575.1 |
| 2001/0041590 A1 | 11/2001 | Silberfenig et al. | |
| 2002/0029091 A1 | 3/2002 | Seno et al. | |
| 2002/0198031 A1 * | 12/2002 | Holmes et al. | 455/569 |
| 2004/0224717 A1 | 11/2004 | Hertzberg et al. | |
| 2005/0064917 A1 | 3/2005 | Peng et al. | |
| 2005/0215285 A1 | 9/2005 | Lin | |
| 2007/0015537 A1 * | 1/2007 | DeBiasio et al. | 455/556.1 |
| 2007/0054550 A1 | 3/2007 | Cuthbert et al. | |

FOREIGN PATENT DOCUMENTS

| | | |
|---|---|---|
| WO | 2007009122 | 1/2007 |

OTHER PUBLICATIONS

Belkin Catalog, Mobile FM Transmitter, http://catalog.belkin.com/IWCatProductPage.process?Merchant_Id=1&Product_Id=158087. Dec. 3, 2003.

Griffin Technology, iTrip FM Transmitter for iPod; http://www.griffintechnology.com/products/itrip/index.html. Dec. 3, 2003.

Belkin Catalog, TuneCase Mobile FM Transmitter, http://catalog.belkin.com/IWCatProductPage.process? Merchand_Id=1&Product_Id=140984. Dec. 3, 2003.

FriendTech, iDea Travel Kit for the iPod and PSP; http://www.friendtech.com/pages/idea_travel_kit.htm. Jun. 15, 2006.

Belkin Catalog, TuneCast Mobile FM Transmitter, http://catalog.belkin.com/IWCatProductPage.process?Merchant_Id=&Section_Id=201526&pcount=&Product_Id=140984. Oct. 14, 2003.

* cited by examiner

ELECTRICAL ACCESSORY AND METHOD OF PROVIDING SAME

CROSS-REFERENCE TO RELATED APPLICATIONS

This application is a continuation-in-part application of U.S. patent application Ser. No. 11/842,921, filed Aug. 21, 2007, which is a continuation application of U.S. Pat. No. 7,292,881, filed Sep. 8, 2004. This application is also a continuation-in-part application of U.S. patent application Ser. No. 11/248,762, filed Oct. 11, 2005. U.S. Pat. No. 7,292,881 and U.S. patent application Ser. Nos. 11/842,921 and 11/248,762 are incorporated herein by reference.

FIELD OF THE INVENTION

This invention relates to electrical accessories for electrical devices, particularly electrical devices including media players and/or cellular telephones. More specifically, the invention relates to an electrical accessory configured to at least partially control an electrical device, to transmit data received from the electrical device to a speaker system, and/or to provide data to the electrical device.

DESCRIPTION OF THE BACKGROUND

Numerous types of electrical devices are portable, such as, for example, cellular (or mobile) telephones, laptop computers, audio playback devices, AM (amplitude modulated) and FM (frequency modulated) radios, CD (compact disk) players, and media (e.g., MP3 (MPEG Audio Layer-3)) players. The terms "electrical device" and "media device" should be broadly understood and include electrical devices of all types and designs (e.g., media players, telephones, audio-visual media players, and devices incorporating media players, telephones, and/or audio-visual devices).

There are many portable electrical devices available, including those manufactured by Sony Corp., Philips Corp., Audiovox Corp., Microsoft Corp. (e.g., the Zune™ MP3 player), and Apple Computer, Inc. (e.g., iPod® MP3 player and iPhone™ device). These electrical devices rely on batteries for their portability and typically utilize headsets, ear phones, or a small built-in speaker for user listening. Battery life is sometimes a problem. After a few hours of usage, most of these electrical devices need an alternate power source, need to be charged, or need to have their batteries replaced. Another limitation is that these electrical devices typically play sound for only one listener at a time (e.g., via headset or ear phones). Even if the electrical device is equipped with a speaker, the device's small size and light-weight design limit the size of the speaker, which tends to make the speaker inadequate for transmitting music to a group of people, e.g., in a vehicle.

Electrical accessories that attempt to overcome these limitations are available, for example, units to supply power to the electrical devices for operation and/or charging and FM transmission systems. An FM transmission system when used in conjunction with electrical devices allows the user to play music files stored on the electrical devices through an FM audio system so that one can listen and allow others to listen to the stored music. However, current FM transmission systems are often unstable and provide weak FM signals, which can result in loss of signal or constant static hiss in the background. In such known FM transmission systems, the FM signal strength is sometimes weakened or lost because of inefficient antenna design (e.g., concerning its size, shape, and/or location).

Another common problem with electrical devices is that these electrical accessories are designed to work with only a limited set of the capabilities of the electrical devices. For examples, many electrical accessories can receive audio (e.g., audio files) from the electrical devices but are not integrated with the other features (e.g., telephonic features) of the electrical device.

Accordingly, a need exists for an apparatus or accessory that allows a user to easily utilize the full breath of capabilities of electrical device that include media players, telephones, and/or audio-visual devices.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable tinder appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that includes a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments disclose an electrical accessory configured to transmit one or more first data signals from a first electrical device to a receiving device. The electrical accessory is also configured to transmit second data signals to the first electrical device. The first electrical device can include a first electrical connector and a second electrical connector. The electrical accessory can include: (a) a power acquisition unit configured to receive electrical power from an external power source; (b) a first electrical interface electrically coupled to the power acquisition unit and configured to mechanically and electrically couple to the first connector to provide the electrical power to the first electrical device; (c) a second electrical interface configured to mechanically and electrically couple to the second connector, the second electrical interface is configured to transmit the second data signals to the first electrical device and to receive the first data signals from the first electrical device; (d) a transmittal mechanism electrically coupled to the second electrical interface and configured to provide the first data signals to the receiving device; and (e) a first microphone electrically coupled to the second electrical interface and configured to receive sounds and convert the sounds into the second data signals.

Various embodiments disclose an electrical apparatus configured to couple to an electrical device. The electrical apparatus can include: (a) a cradle for holding the electrical device; (b) a first coupling configured to transmit electrical power to the electrical device; (c) a second coupling configured to transmit first data to the electrical device and receive second data from the electrical device; (d) a first control configured to at least partially operate the electrical device; (e) a cigarette lighter adapter electrically coupled to the first coupling; (f) a gooseneck mechanically coupling the holder to the cigarette lighter adapter; (g) a microphone electrically coupled to the second coupling and configured to provide the first data to the first coupling; and (h) a transmitter electrically coupled to the second coupling. The transmitter can be configured to transmit the second data from the electrical device to an external speaker system.

Moreover, embodiments can disclose an electrical device configured to couple to a media device. The electrical device can include: (a) a first coupling configured to transmit first data to the media device and receive second data from the media device; (b) a first control configured to at least partially operate the media device; (c) a microphone electrically coupled to the first coupling and configured to provide the first data to the first coupling; (d) a transmitter electrically coupled to the first coupling, the transmitter is configured to transmit the second data received from the media device to an external speaker system; (e) a first housing at least partially enclosing the transmitter, the first housing comprising a first coupling mechanism; (f) a cigarette lighter adapter configured to couple to an external electrical power source and configured to provide electrical power to at least the microphone, the transmitter, and the first control; and (g) a second housing at least partially enclosing the cigarette lighter adapter, the second housing comprising a second coupling mechanism. The first coupling mechanism is configured to couple to the second coupling mechanism such that the first housing is supported by the second housing.

In some embodiments, a method of providing an electrical accessory can include: (a) providing a power acquisition unit configured to receive power from an external power source; (b) providing a first electrical interface such that the first electrical interface can be mechanically and electrically coupled to a first connector of a first electrical device; (c) electrically coupling the first electrical interface to the power acquisition unit; (d) providing a second electrical interface such that the second electrical interface can be mechanically and electrically coupled to a second connector of the first electrical device to transmit first data signals to the first electrical device and to receive second data signals from the first electrical device; (e) providing a transmittal mechanism such that the transmittal mechanism can provide the second data signals to a receiving device; (f) electrically coupling the transmittal mechanism to second electrical interface; (g) providing a first microphone such that the first microphone can receive sounds and convert the sounds into the first data signals; and (h) electrically coupling the first microphone to the second electrical interface.

Figure 1:
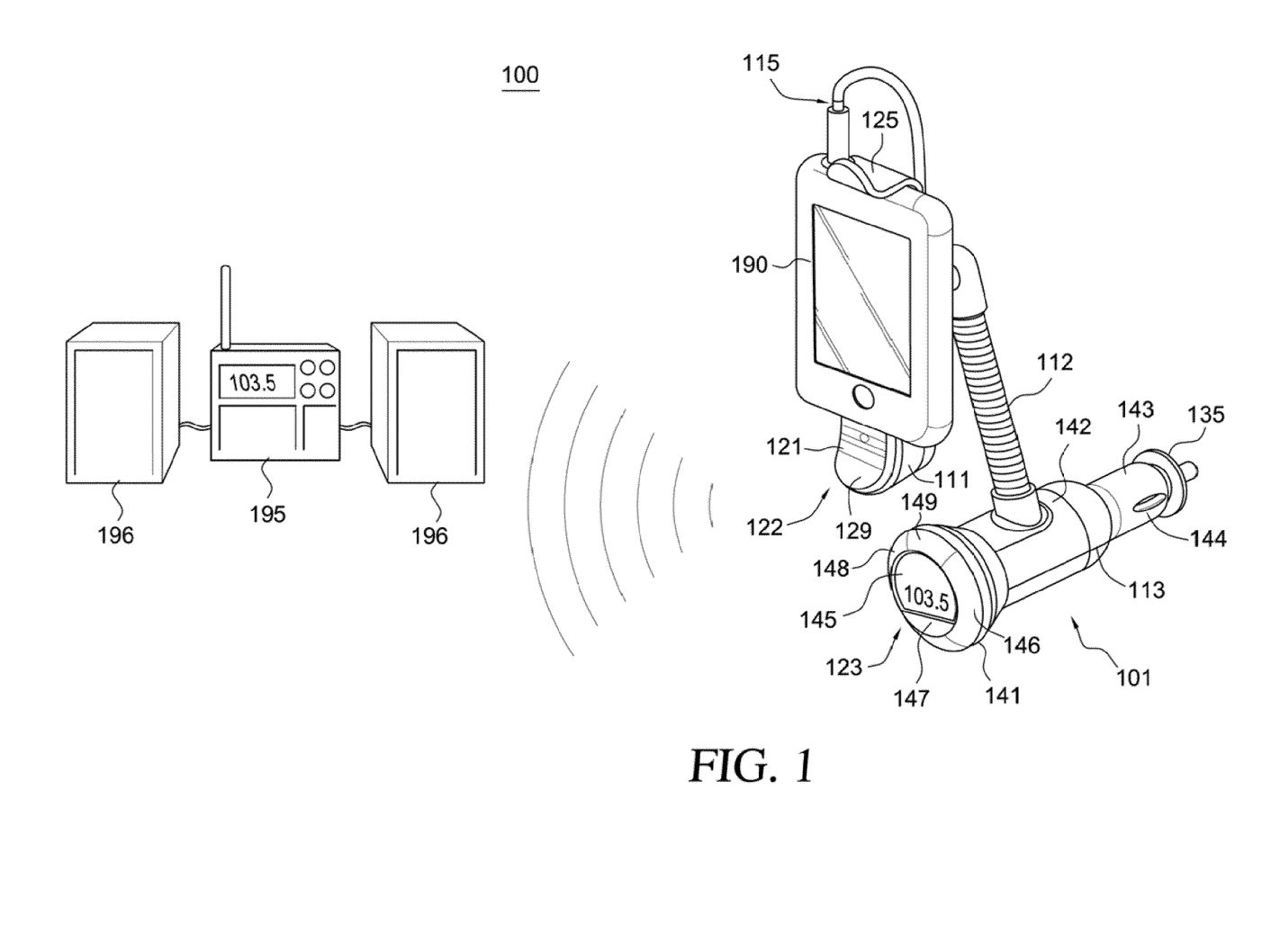
FIG. 1 illustrates an overview of a system for transmitting data signals between an electrical device, a receiving device, and an electrical accessory, according to a first embodiment.

Turning to the drawings, FIG. 1 illustrates an overview of a system 100 for transmitting data signals between an electrical device 190; a receiving device 195, and electrical accessory 101, according to a first embodiment.

In some examples, electrical accessory 101 can be configured to transmit one or more first data signals from electrical device 190 to receiving device 195 and also provide second data signals to electrical device 190. System 100 and electrical accessory 101 are merely exemplary and are not limited to the embodiments presented herein. System 100 and electrical accessory 101 can be employed in many different embodiments or examples not specifically depicted or described herein.

In some embodiments, electrical device 190 is an electrical device configured to produce and receive electrical signals. For example, electrical device 190 can be a cellular (or mobile) phone, a laptop computer, an audio playback device, a portable AM (amplitude modulated) and FM (frequency modulated) radio, a satellite radio, a portable CD (compact disk) player, a data storage device, an audio player, an audio-visual player, and/or a portable media (e.g., MP3) player. The term "electrical device 190" includes electrical devices of all types and designs, including, but not limited to, any of the types of devices described above and/or any combination thereof. For example, electrical device 190 could be an iPhone™ device, manufactured by Apple Computers, Inc. of Cupertino, Calif. The iPhone™ device includes an MP3 player, an audio visual player, and a cellular telephone.

Receiving device 195 can be any electrical device that includes a receiver configured to receive radio frequency (or other high frequency) signals. In some embodiments, receiving device 195 can be a radio. Receiving device 195 can include or be coupled to one or more speakers 196. For example, if receiving device 195 is a car radio, the car radio can be electrically coupled to the car's speaker system.

In some examples, the set of radio frequencies can include the full FM band. In the United States (US), the FM band includes the frequencies or channels between 87.5 MHz (megahertz) and 108 MHz. In Japan, the FM band includes frequencies between 76 MHz and 90 MHz. In Europe, the FM band includes frequencies between 87.6 MHz and 107.9 MHz. In other countries, the full FM band can scan other ranges of radio frequencies. In further embodiments, the set of radio frequencies include other carrier frequency sets or bands (e.g., the AM (amplitude modulated) band, the VHF (very high frequency) band, or the UHF (ultra high frequency) band).

Figure 2:
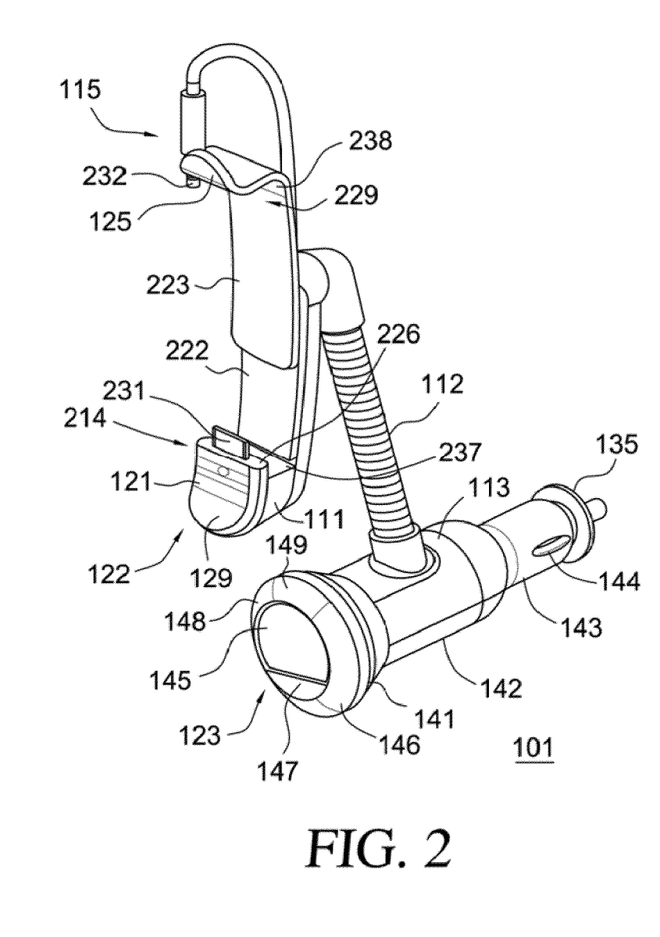
FIG. 2 illustrates an isometric view of the electrical accessory of FIG. 1, according to the first embodiment.
Figure 3:
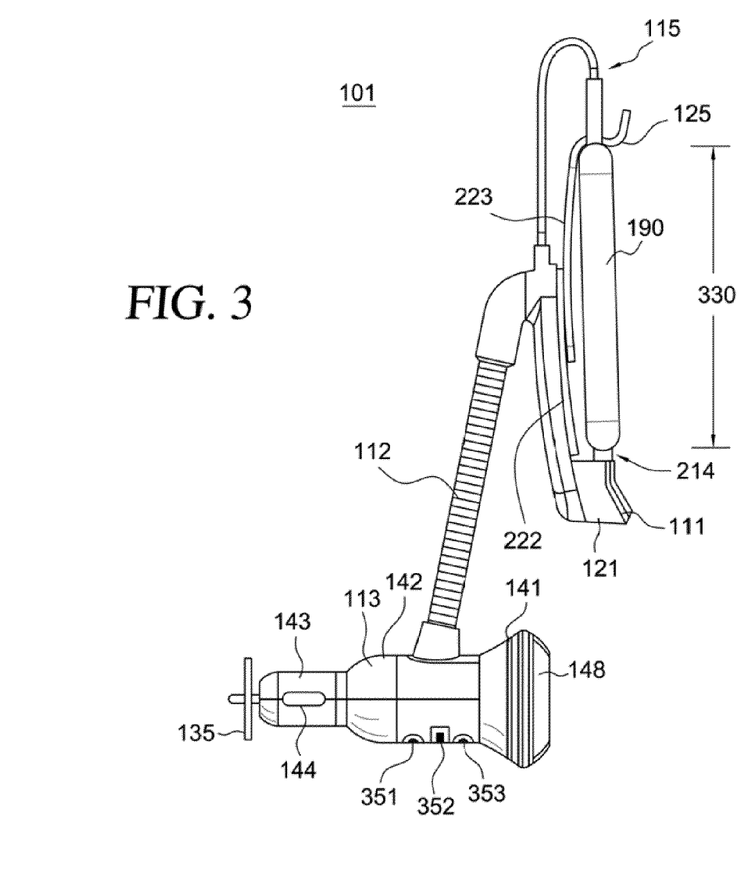
FIG. 3 illustrates a side view of the electrical accessory of FIG. 1 coupled to the electrical device of FIG. 1, according to the first embodiment.
Figure 4:
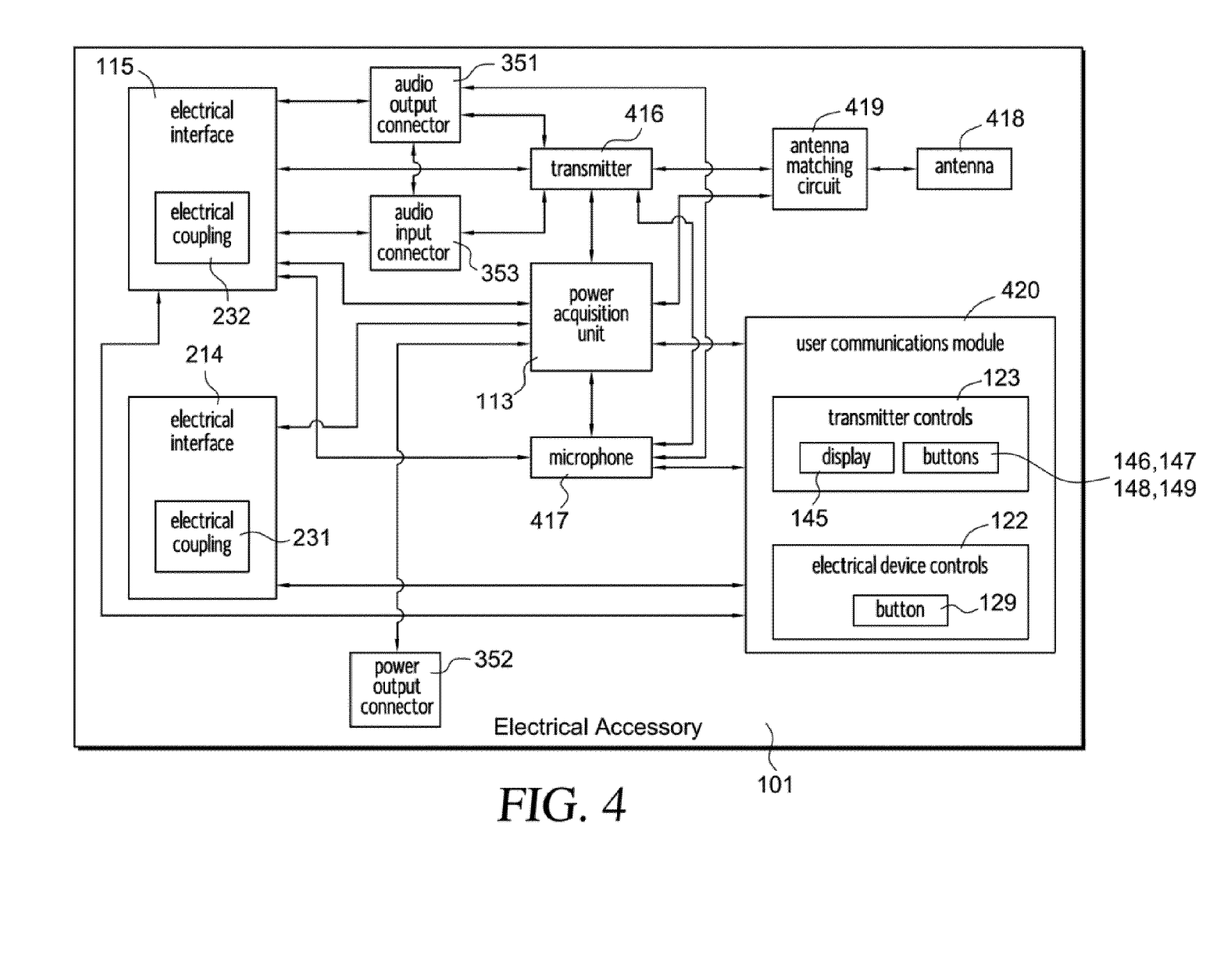
FIG. 4 illustrates a block diagram of the electrical accessory of FIG. 1, according to the first embodiment.
Figure 7:
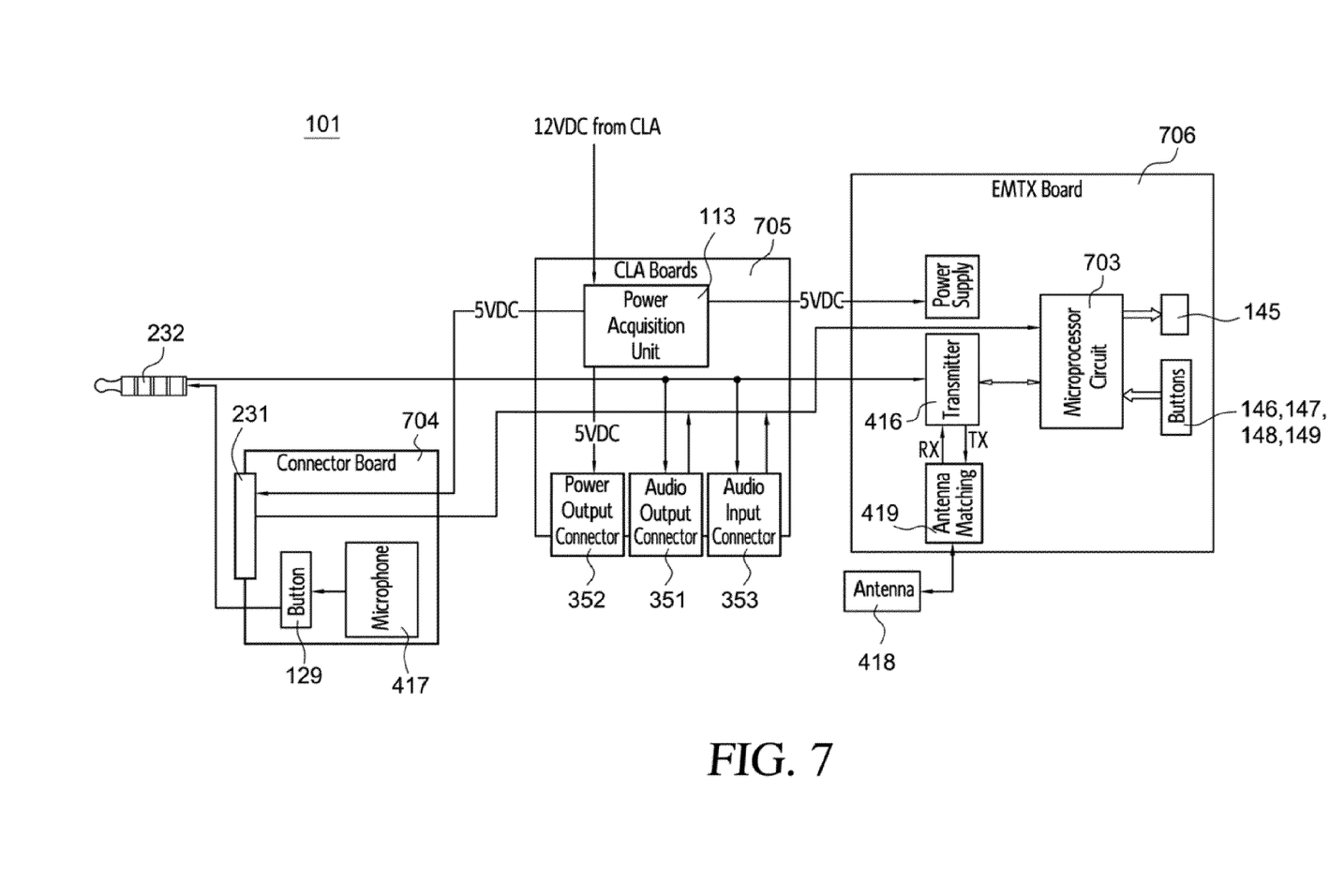
FIG. 7 illustrates another block diagram of the electrical accessory of FIG. 1, according to the first embodiment.

FIG. 2 illustrates an isometric view of electrical accessory 101, according to the first embodiment. FIG. 3 illustrates a side view of electrical accessory 101 coupled to electrical device 190, according to the first embodiment. FIG. 4 illustrates a block diagram of electrical accessory 101, according to the first embodiment. FIG. 7 illustrates another block diagram of electrical accessory 101, according to the first embodiment As illustrated in FIGS. 1-4 and 7, electrical accessory 101 can include: (a) a cradle or holder 111 configured to hold or couple to electrical device 190; (b) a connector 112; (c) a power acquisition unit 113 configured to receive electrical power from an external power source; (d) an electrical interface 214 (FIGS. 2 and 4) electrically coupled to power acquisition unit 113 and configured to mechanically and electrically couple to electrical device 190; (e) an electrical interface 115 configured to mechanically and electrically couple to electrical device 190; (f) at least one transmittal mechanism or transmitter 416 (FIG. 4) electrically coupled to electrical interface 115 and configured to provide data signals to receiving device 195; (g) at least one microphone 417 (FIG. 3) electrically coupled to electrical interface 115 and configured to receive sounds and convert the sounds into data signals; and (h) a control or user communications module 420 (FIG. 4).

In some embodiments, portions of electrical interface 214, electrical interface 115, transmitter 416, microphone, user control module 420 can include or be controlled by a microprocessor circuit 703 (FIG. 7). For example, microprocessor circuit 703 can be a microprocessor no. C8051T611-GM, manufactured by Silicon Laboratories, Inc. of Austin, Tex. or microcontroller no. ST72F264G2H1, manufactured by Singapore Technologies of Singapore.

In various examples, electrical accessory 101 can include three or more electrical circuitry boards 704, 705, and 706 (FIG. 7). In one example, microphone 417, button 129, and electrical coupling 231 can be located on or electrically coupled to electrical circuitry board(s) 704. Power acquisition unit 113, and connectors 351, 352, and 353 can be located on or electrically coupled to electrical circuitry board(s) 705. Transmitter 416, antenna matching circuit 419, microprocessor circuit 703, display 145, and buttons 146, 147, 148, and 149 can be located on or electrically coupled to electrical circuitry board(s) 706.

In some examples, electrical interface 214 can include an electrical coupling 231 and the electronic circuitry necessary to electrically couple to and communicate with electrical device 190. Similarly, electrical interface 115 can include an electrical coupling 232 (FIG. 2) and the electronic circuitry necessary to electrically couple to and communicate with electrical device 190. In some examples, electrical coupling 231 can include a power coupling and a signal coupling. In one example, the power coupling and the signal coupling can each be one or more pins in electrical coupling 231. In various embodiments, only the power coupling in electrical coupling 231 is used by electrical accessory 101.

Broadly speaking, and as explained in detail below, in some embodiments, electrical accessory 101 can be electrically coupled to electrical device 190 through electrical couplings 231 and 232. Electrical device 190 can also be mechanically coupled to electrical accessory 101 using holder 111.

Electrical accessory 101 can receive data signals from electrical device 190 (e.g., an iPhone™ device) through electrical coupling 232 and wirelessly transmit the data signals to receiving device 195 (e.g., a car radio) over a radio frequency using transmitter 416 and an antenna 418 (FIG. 4). Microphone 417 can receive sounds (e.g., a user's voice) and convert the sounds into data signals that are provided to electrical device 190. In some examples, electrical device 190 includes a cellular telephone, the data signals transmitted from electrical accessory 101 to receiving device 195 are the incoming audio from the cellular telephone; and the data signals provided to electrical device 190 from electrical accessory 101 can be the outgoing audio. In these examples, electrical accessory 101 and receiving device 195 can function as a speaker system (i.e., a speaker phone) for electrical device 190 with the speakers, for example, being the car speaker system.

In the same or different embodiment, electrical device 190 can include a media player. Electrical accessory 101 can receive data signals (e.g., the audio) from electrical device 190 through electrical interface 115 and wirelessly transmit the data signals to receiving device 195 (e.g., a car radio) over a radio frequency via transmitter 416.

Electrical accessory 101 can also at least partially control electrical device 190 using electrical device controls 122. As will be described in detail below, electrical device controls 122 can include a single button 129 that allows the user to answer or end a telephone call, or to play, pause, fast forward and/or rewind audio being played on electrical device 190.

Electrical accessory 101 can also be coupled to an external power source (e.g., a cigarette lighter of a vehicle) and provide electrical power to electrical device 190 through electrical interface 214.

Cradle or holder 111 can include: (a) a base portion or base 121 configured to couple to at least one electrical device 190; (b) one or more extension portions or extensions 222 and 223 (FIG. 2) extending away from base 121, and (c) at least one clasp or support 125.

Base 121 can be configured to couple to a side (e.g., the bottom) of electrical device 190. In the example illustrated in FIGS. 1-3, base 121 includes a substantially level top surface 226 with electrical coupling 231 protruding from an aperture in top surface 226. In this example, electrical device 190 can be placed on top surface 226 and coupled to electrical coupling 231. In other examples, electrical coupling 231 can protrude from other portions of holder 111 such as, for example, extension 222, extension 223, or support 125.

In many embodiments, base 121 can include an interior cavity (not shown). This interior cavity can house a portion of the electronic circuitry necessary to operate electrical accessory 101. For example, a portion of electrical coupling 231, a portion of electrical device controls 122, microphone 417, and at least a portion of the electronic circuitry need to operate electrical coupling 231, electrical device controls 122, and microphone 417 can be located in the interior cavity of base 121.

Some examples of electrical device 190 (e.g., the iPhone™ device) include transmitter device(s) (e.g., radio frequency or cellular transmitters) at the bottom of the electrical device around the female connector that mates with electrical coupling 231. To minimize any interference between the electronic circuitry of electrical accessory 101 and the transmitter devices of electrical device 190, a portion of the electronic circuitry of electrical accessory 101 can be placed immediately underneath electrical coupling 231, instead of at other portions of base 121 or holder 111. Placing the electronic circuitry below electrical coupling 231 can help minimize the interference between this electronic circuitry and the transmitter device(s) of electrical device 190. For example, electrical circuitry boards 704 and/or 706 can be placed below electrical coupling 231.

Base 121 can be coupled to end 237 (FIG. 2) of extension 222. Support 125 can be coupled to end 238 (FIG. 2) of extension 223. Extension 222 can be adjustably coupled to extension 223 such that a distance 330 (FIG. 3) between base 121 and support 125 can be adjusted to correspond to the length or height of electrical device 190.

In many embodiments, a portion of extension 222 can abut extension 223 and be coupled together using an adjustable mechanism. Extensions 222 and extension 223 can be coupled such that the portion of extension 222 abutting extension 223 can be increased or decreased to change distance 330. For example, the abutting portion of extension 223 can be coupled with a screw or bolt to extension 222. In other examples, other adjustable coupling mechanisms (e.g. magnets, friction, hook and loop material such as Velcro® material, etc.) can be used to couple extension 222 to extension 223. In some examples, distance 330 can be adjusted to any distance in a predetermined range. For example, distance 330 can be adjusted in the range of approximately 65 millimeters to approximately 120 millimeters.

Support 125 can be coupled to extension 223 such that the combination of support 125, extensions 222 and 223, base 121, and electrical coupling 231 securely holds electrical device 190 to electrical accessory 101. In some examples, support 125 and extensions 222 and 223 can be designed and manufactured such that after electrical device 190 is coupled to electrical coupling 231, distance 330 can be slightly increased to allow electrical device 190 to be slid into groove 229 (FIG. 2) of support 125. That is, support and/or extensions 222 and 223 are constructed from a material that is bendable or pliable enough to allow insertion of electrical device 190 into groove 229 but rigid enough to hold securely electrical device 190 in groove 229 after insertion.

In some examples, holder 111 is rotatably coupled to connector 112. That is, holder 111 (and electrical device 190) can be rotated relative to connector 112 and power acquisition unit 113. In some examples, a point on holder 111 can be rotated clockwise or counterclockwise one hundred and eighty degrees relative to a point on connector 112 and a point on power acquisition unit 113.

Connector 112 can be a semi-rigid elongated portion configured to allow a position of holder 111 to be semi-permanently adjusted relative to a position of the power acquisition unit 113. In some examples, connector 112 can include a gooseneck, which can be compliant (or obedient) flexible tubing, and is preferably metallic or metal covered with, e.g., plastic or elastic material on its outside. A gooseneck can be considered to be a coiled layered construction in which adjacent coils overlap but can be moved with respect to each other (in a sense, slide on each other). Goosenecks tends to hold the position into which it is bent (i.e., it is semi permanently adjustable or repositionable), unless it is bent beyond its limit. The two "layers" of the gooseneck can be considered to have different thicknesses. Thus, a gooseneck has two outer diameters, the outer diameter of the thicker layer, and the outer diameter of the thinner layer, which alternate in the gooseneck. In some embodiments, connector 112 can be between 7.5 centimeters (cm) and 15.2 cm (e.g., approximately 11.4 long cm); its larger outer diameter is approximately 9 millimeters (mm); its smaller outer diameter is approximately 8.2 millimeters; its inner diameter is approximately 4.5 millimeters; the center-to-center spacing between the larger diameter portions is approximately 3.5 millimeters; the longitudinal gap between the larger diameter portions is approximately 1 millimeter; and the material of construction can be steel.

Connector 112 must not be so stiff that it cannot be readily repositioned by the user; however, it must be stiff enough to maintain holder 111 (with electrical device 190) in position with respect to power acquisition unit 113 after holder 111 and connector 112 have been put into their desired position.

Connector 112 used in some embodiments are available in varying dimensions (e.g., outer diameters of 2 millimeter or less to over 16 millimeters). Connector 112 can be implemented with a design, dimensions, and materials of construction to select for any particular usage based on the desired length of connector 112, the weight of holder 111 and electrical device 190 to be held in it, whether connector 112 is to function as a broadcast antenna and, if so, for what range of radio frequencies.

Power acquisition unit 113 includes: (a) an end portion 141; (b) a middle portion 142; and (c) an end portion 143. Connector 112 can be coupled to middle portion 142. In other examples, connector 112 can be coupled to end portion 141 or 143. In some examples, end portion 141 has a larger diameter than middle portion 142, and middle portion 142 has a larger diameter than end portion 143.

In numerous embodiments, an internal cavity exists inside of end portion 141, end portion 143, and middle portion 142. This internal cavity can contain the electrical circuitry for obtaining power from an external power source (e.g., electrical circuitry board(s) 705) such as a cigarette lighter and then processing the electrical power (i.e., the circuitry for cigarette lighter adapter). The internal cavity can also contain electrical circuitry for transmitter 416 and transmitter controls 123 (e.g. electrical circuitry board(s) 706). In some examples, the electrical circuitry for transmitter 416 and transmitter controls 123 can be located in end portion 141.

Although the power acquisition unit 113 is preferably removably coupleable to an external power source (e.g., cigarette lighter), the power acquisition unit 113 can in some cases be permanently affixed to the external power source. For example, a driver of a vehicle who does not smoke may obtain electrical accessory 101 and hard-wire it into the cigarette lighter of the vehicle.

In some examples, power acquisition unit 113 is configured to couple to a cigarette lighter of a vehicle. That is, power acquisition unit 113 includes a cigarette lighter adapter. The term "cigarette lighter" is to be broadly understood and includes any power source, whether or not in a vehicle and whether or not customarily used or designed for lighting cigarettes. Similarly, the term "cigarette lighter adapter" is to be broadly understood and includes any member, device, etc. at least a part of which mechanically mates with or fits into a "cigarette lighter" (as that term is to be broadly understood) and can draw power from it.

End portion 143 can be configured to be inserted into an external power source such as the cigarette lighter of a vehicle, which is usually a cylindrical cavity. To help position and stabilize the power acquisition unit 113 in such a cavity, non-conductive stabilizing springs 144 are provided on opposite sides of end portion 143.

Because springs 144 may be insufficient to stabilize the electrical accessory 101 in all of the various size cigarette lighters that are found in vehicles, and particularly because of the cantilevered weight of electrical accessory 101, a stabilizer 135 can be used Stabilizer 135 can include a deformable resilient member that is larger than the inner circumference of essentially all known vehicle cigarette lighters so that pushing end portion 143 into the cigarette lighter causes the outer circumference of the deformable resilient member to bend away from the distal end of end portion 143 (i.e., the part of end portion farthest from middle portion 142) and towards the proximal end of end portion 143 (the part of end portion 143 closest to middle portion 142) while at least some of the deformable resilient member even after such deformation continues to push against the inner circumference of the cigarette lighter.

Stabilizer 135 allows power acquisition unit 113 to fit in the cigarette lighter of virtually any vehicle to mechanically and electrically semi-permanently (firmly but removably) couple electrical accessory 101 to keep power acquisition unit 113 in the desired position and maintain good electrical contact with the cigarette lighter. Stabilizer 135 retards or prevents undesired rotation, wobbling, and longitudinal movement of power acquisition unit 113 in the cigarette lighter. Thus, stabilizer 135 tends to prevent normal vibration, centrifugal forces (from the vehicle's turning), and bumps in the road from moving power acquisition unit 113 (and therefore the electrical accessory 101) from its desired position.

Transmitter 416 can be configured to transmit data over the at least one radio frequency using antenna 418. Transmitter 416 can be electrically coupled to electrical interface 115 and configured to transmit data signals (e.g., audio signals) to external speakers 196 coupled to receiving device 195. In many examples, transmitter 416 includes a radio frequency transmitter. Transmitter 416 can be coupled to antenna 418 through antenna matching circuit 419 (FIG. 4). In some examples, connector 112 (e.g., the gooseneck portion of connector 112) is or can include antenna 418. That is, connector 112 can be configured to radiate the radio frequency signals received from transmitter 416.

To comply with FCC (Federal Communications Commission) requirements, the output of transmitter 416 (an electrical signal) is coupled to an attenuation circuit (not shown). The amount of attenuation that is needed to comply with FCC requirements is dictated by the output of the particular transmitter, the quality, and type of antenna that is being utilized, and the environment in which the transmitter is being used. Consequently, the specific design of the attenuation circuit is a matter of design choice depending upon the needs of the particular application. For some types of electrical signals to be broadcast by transmitter 416, an attenuation circuit will not be needed. In some embodiments, the attenuation circuit can be a portion of antenna matching circuit 419.

In some embodiments, electrical accessory 101 can be coupled to an external antenna (not shown) through an external antenna matching circuit (not shown) in addition to or instead of antenna 418. Electrical accessory 101 can send and/or receive electrical signals using the external antenna.

User communications module 420 can include: (a) transmitter controls 123; and (b) electrical device controls 122. Transmitter controls 123 can include: (a) buttons 146, 147, 148, and 149; (b) display 145; and (c) the electrical circuitry to implement buttons 146, 147, 148, and 149 and display 145.

In some examples, button 148 can be semi-permanently set to select a radio frequency (i.e., a transmission frequency) for transmitter 416 to transmit the data signal to receiving device 195. In the same examples, button 149 can be semi-permanently set to select an audio mode (e.g., AM or FM) for the data signals. Button 147 can be semi-permanently set to select a radio frequency for transmitter 416 from a memory (not shown) within electrical accessory 101. Button 149 can be used to scan for an open radio frequency for transmitter 416. In some embodiments, buttons 146, 147, 148, and 149 can be covered with a protective membrane. In other embodiments, buttons 146, 147, 148, and 149 are devoid of a protective membrane and/or protrude from holder 111.

Display 145 can be used to display information about the selected transmission frequency or audio mode. For example, display 145 can display the carrier frequency in the format "XXX.X." In the same or different example, video screen can either display a predetermined name for an audio mode (e.g., "SPOKEN WORD MODE") or a list of settings (e.g., "Dynamic Compressor On" and/or "Output Mode: Stereo"). In some embodiments, display 145 can show the transmission frequency and audio mode information simultaneously. In other embodiments, the information shown on display 145 is related to the last pressed button of buttons 146, 147, 148, and 149 or predetermined default information. In many examples, display 145 is an LCD (liquid crystal display). In other examples, display 145 can be a touch screen.

In some examples, end portion 141, display 145, and buttons 146, 147, 148, and 149 can be rotated relative to middle portion 142 and end portion 143. In some examples, a point on end portion 141, display 145, and buttons 146, 147, 148, and 149 can be rotated clockwise or counterclockwise two hundred and seventy degrees relative to a point on middle portion 142 and a point on end portion 143.

Electrical device controls 122 can include button 129 and the electrical circuitry to implement the electrical device controls. Electrical device controls 122 are configured to at least partially control electrical device 190. For example, button 129 can be used to begin and end a telephone call when electrical device 190 includes a cellular telephone. Button 129 can also be used to play, pause, fast forward, and rewind when electrical device 190 is configured to play music or other audio.

In some embodiments, when electrical device 190 includes a media player, the providing of audio by electrical device 190 can be started with a push of button 129. A second push of button 129 can pause the audio. A third push of button 129 immediately after the second push (i.e., two pushes of button 129 in immediate succession) can be a signal that the user wants to fast forward the audio. A fourth push of button 129 immediately after the third push (i.e., three pushes of button 129 in immediate succession) can be a signal that the user want to rewind or move to a previous portion of the audio. Other functionality can be implemented with other combinations of pushing of button 129 (e.g., four pushes of button 129 in immediate succession).

In embodiments where electrical device 190 includes a cellular telephone, instead of or in addition to a media player, when receiving an incoming telephone call, a push of button 129 can interrupt other functions (e.g., stop any playing audio) and answer the telephone call. Similarly, another push of button 129 can end the telephone call and restart any other functions stopped when the telephone call was answered (e.g., resume playing the audio stopped when the telephone call was received).

In other examples, electrical device controls 122 can be implemented with two or more buttons. For examples, electrical device controls 122 can include a play/pause button, a stop button, a forward button, a back button, an answer/hang-up button, etc.

Although pushbuttons are shown in FIGS. 1-3, any type of button can be used, and the term "button" should be broadly understood to refer to any type of mechanism (with or without moving parts) whereby the user can input to electrical accessory 101 his or her data (for example, selection of a frequency), e.g., a mechanical pushbutton, an electrostatic pushbutton, an electrostatic array, or any other input device of any type.

The iPhone™ device includes a thirty-pin female connector (i.e., a dock connector) configured to receive electrical power and transfer data signals. The iPhone™ device also includes a 3.5 millimeter (mm) female TRS (Tip, Ring, Sleeve,) connector (e.g., a headphone jack) for transferring data signals. In some examples, electrical interfaces 214 and 115 can be configured to couple to these two connectors on the iPhone™ device.

For example, electrical coupling 231 can be a thirty-pin male connector configured to mechanically and electrically couple to a thirty-pin female connector (not shown) on electrical device 190. In some examples, electrical interface 214 can also be configured to send and receive data signals from electrical device 190. However, the ability of electrical coupling 231 to transfer data signals with electrical device 190 is not utilized in many embodiments of electrical accessory 101 because the data signal transfer with electrical device 190 is handled by electrical coupling 232.

Electrical coupling 232 can be configured to mechanically and electrically couple to a corresponding connector (not shown) on electrical device 190. In some examples, electrical coupling 232 can be a 3.5 mm male TSR connector. In other examples, electrical interface 115 can includes other connectors that correspond to electrical connectors on electrical device 190. Electrical accessory 101 can use electrical interface 115 to receive data (e.g., audio) signals from electrical device 190 and to provide data signals from microphone 417 or audio input connector 353 to electrical device 190.

Microphone 417 can be electrically coupled to electrical interface 115 and configured to provide data signals to electrical interface 115. Microphone 417 can be located at holder 111. In some examples, microphone 417 is located at base 121 (e.g., at the right and/or left side of base 121 where no buttons are located). In other examples, microphone 417 can be located at extensions 222, extension 223, support 125, or electrical power acquisition unit 113. In many embodiments, microphone 417 is located at base 121 instead of at extension 222, extension 223, support 125, or electrical power acquisition unit 113 because locating microphone at base 121 can provide better pick-up of voices and other audio.

In various embodiments, electrical accessory 101 can include one or more additional electrical interfaces. For example, as shown in FIG. 3, electrical accessory 101 can further include: (a) an audio output connector 351; (b) power output connector 352; and (c) a microphone input port or audio input connector 353. In some examples, audio output connector 351, audio output connector 351, power output connector 352, and audio input connector 353 can be located at middle portion 142.

In some examples, audio output connector 351 can be a 3.5 mm female TSR connector. In some examples, audio output received from electrical device 190 through electrical interface 115 can be provided to audio output connector 351. Audio output connector 351 can be electrically and mechanically coupled to receiving device 195 to provide the data signals from electrical device 190 to receiving device 195. In some examples, electrical accessory 101 does not include transmitter 416, and audio output connector 351 can be the sole means for communicating data signals to receiving device 195. In some examples, audio output connector 351 can be considered part of transmitter 416.

Power output connector 352 can be electrically coupled to power acquisition unit 113 and configured to provide electrical power to other electrical devices. In some examples, power output connector 352 can be a female universal serial bus connector.

Audio input connector 353 can be electrically coupled to electrical interface 115. In some examples, an external microphone or other external audio input device can be coupled to audio input connector 353 to provide data signals to electrical device 190. In some examples, the external audio input device can be used to provide data signals to electrical device 190 instead of or in addition to microphone 417. In various embodiments, audio input connector 353 is a 3.5 mm female TSR connector.

Figure 5:
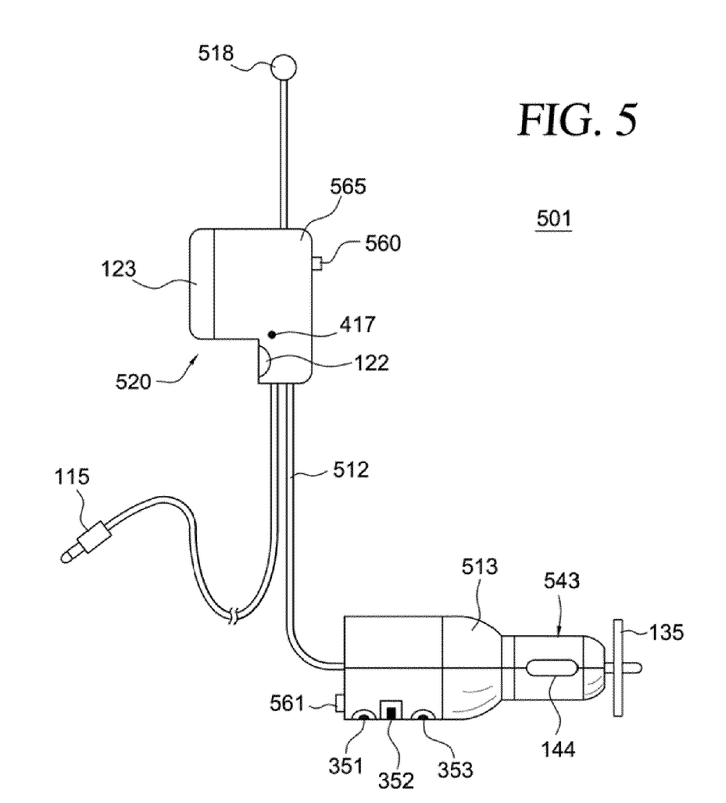
FIG. 5 illustrates a side view of an electrical accessory, according to a second embodiment.

Turning to another embodiment, FIG. 5 illustrates a side view of electrical accessory 501, according to a second embodiment. Electrical accessory 501 can be similar to electrical accessory 101 (FIG. 1), except that electrical accessory 501 does not have holder 111. More specifically, electrical accessory 501 can include: (a) electrical interface 115 configured to mechanically and electrically couple to electrical device 190 (FIG. 1); (b) at least one transmitter mechanism or transmitter 416 (FIG. 4) electrically coupled to electrical interface 115 and configured to provide data signals to receiving device 195 (FIG. 1); (c) an antenna 518 electrically coupled to transmitter 416; (d) at least one microphone 417 electrically coupled to electrical interface 115 and configured to receive sounds and convert the sounds into data signals; (e) a user communications module 520; (f) power acquisition unit 513 configured to receive power from an external power source; (g) a housing 565 at least partially enclosing user communications module 520, transmitter 416, and microphone 417; (h) a connector 512 mechanically coupling housing 565 to power acquisition unit 513; (i) a coupling mechanism 560 located at housing 565; (j) a coupling mechanism 561 located at power acquisition unit 513 and configured to couple to coupling mechanism 560; (k) audio output connector 351; (l) power output connector 352; and (in) microphone input port or audio input connector 353. User communications module 520 can include: (a) a transmitter controls 123; and (b) electrical device controls 122. In some examples, power acquisition unit 513 can include: (a) a housing 543 that at least partially encloses a cigarette lighter adapter; (b) springs 144; and (c) stabilizer 135.

Broadly speaking, in some embodiments, electrical accessory 501 can be electrically coupled to electrical device 190 through electrical interfaces 115. Electrical accessory 501 can receive data signals from electrical device 190 (e.g., an iPhone™ device) through electrical interface 115 and wirelessly transmit the data signals to receiving device 195 (e.g., a car stereo) over a radio frequency via transmitter 416. Microphone 417 can receive sounds and convert the sounds into data signals that are provided to electrical device 190. In some examples, electrical device 190 includes a cellular telephone; the data signals transmitted from electrical accessory 501 to receiving device 195 are the incoming audio from the cellular telephone; and the data signals provided to electrical device 190 by electrical accessory 501 can be the outgoing audio. In these examples, electrical accessory 501 and receiving device 195 can function as a speaker system (i.e., a speaker phone) for electrical device 190 with the speakers, for example, being the car speaker system.

In the same or different embodiment, electrical device 190 can include a media player. Electrical accessory 501 can receive data signals from electrical device 190 through electrical interface 115 and wirelessly transmit the data signals to receiving device 195 (e.g., a car radio and speaker system) over a radio frequency.

Electrical accessory 501 can also at least partially control electrical device 190 using electrical device controls 122. Electrical device controls 122 can include a single button that allows the user to answer or end a telephone call, and/or to play, pause, fast forward and/or rewind audio played by electrical device 190.

In additionally to the functionality described above, coupling mechanism 560 can be coupled to coupling mechanism 561 such that housing 565 is supported by power acquisition unit 513. That is, coupling mechanism 560 is configured to mechanically couple to coupling mechanism 561 to hold housing 565 adjacent to power acquisition unit 513. When power acquisition unit 513 is coupled to a cigarette lighter of a vehicle, housing 565 can be coupled to power acquisition unit 513 such that electrical device controls 122 are easily accessible to the operator of the vehicle and do not interfere with the vehicle controls (including the radio of the vehicle).

In some examples, coupling mechanism 560 includes a first magnet. Coupling mechanism 561 can include a second magnet. The first magnet can be coupled to the second magnet to hold housing 565 adjacent to power acquisition unit 513. In other examples, coupling mechanism 560 and coupling mechanism 561 can be other complementary coupling mechanisms. For examples, coupling mechanisms 560 and 561 could be snaps, Velcro® material, etc. In a different embodiment, coupling mechanism 561 is not located at power acquisition unit 513, but is designed to be affixed to a portion of the car, such as the dash board.

Figure 6:
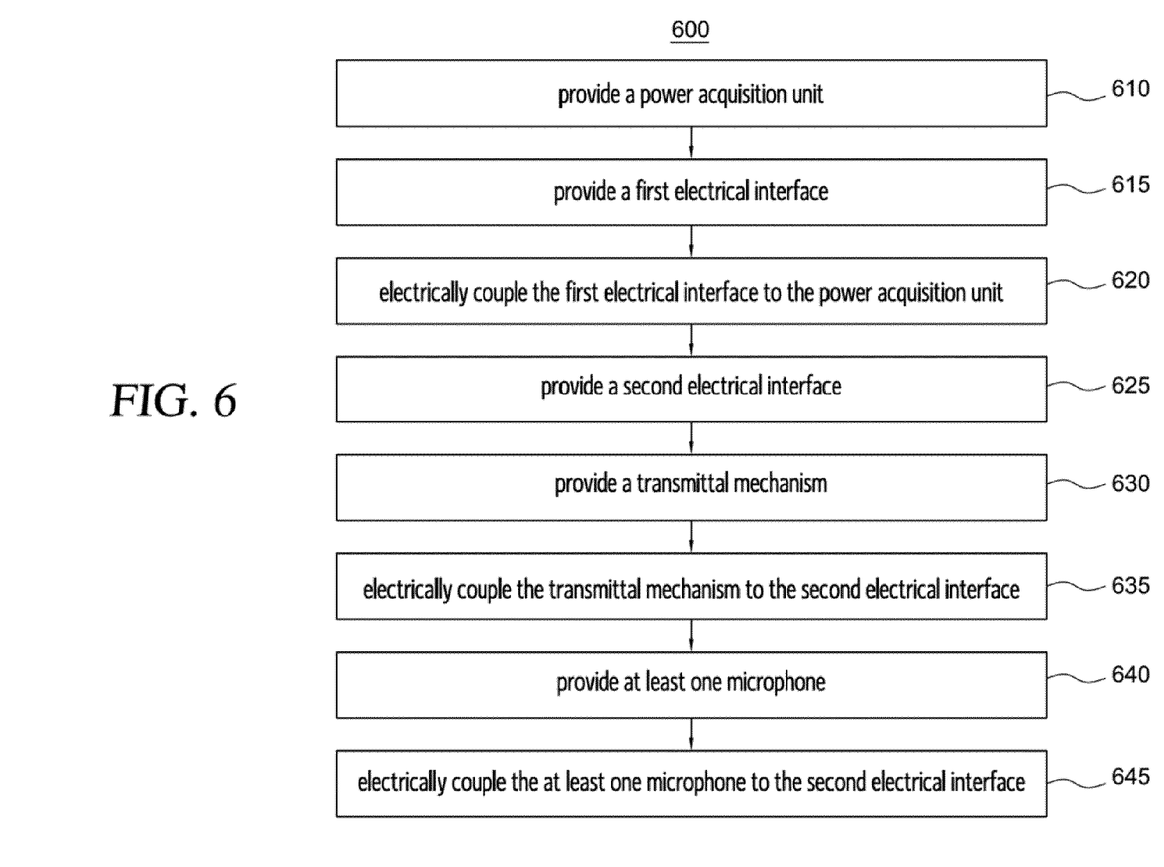
FIG. 6 illustrates an example of a method of providing an electrical accessory, according to an embodiment.

FIG. 6 illustrates an example of a method 600 of providing an electrical accessory, according to an embodiment. Method 600 is merely exemplary, and is not limited to the specific embodiments or examples presented herein. Accordingly, method 600 can be employed in many other sequences, embodiments, or examples not specifically depicted or described herein.

Method 600 includes an activity 610 of providing a power acquisition unit. The power acquisition unit can be configured to receive power from an external power source. As an example, the power acquisition unit can be similar or identical to power acquisition unit 113 or 513 of FIGS. 1 and 5, respectively. In some examples, the external power source can be a vehicle cigarette lighter, and the power acquisition unit can include a vehicle cigarette lighter adapter.

Method 600 in FIG. 6 continues with an activity 615 of providing a first electrical interface. In some examples, the first electrical interface can mechanically and electrically couple to a first connector of the first electrical device. As an example, the first electrical interface can be similar or identical to electrical interface 214 of FIGS. 2 and 4.

Next, method 600 of FIG. 6 includes an activity 620 of electrically coupling the first electrical interface to the power acquisition unit. In some examples, the coupling of the first electrical interface to the power acquisition unit can be similar or identical to the coupling of power acquisition unit 113 to electrical interface 214. In other examples, method 600 does not include activities 615 and 620.

Method 600 of FIG. 6 further includes an activity 625 of providing a second electrical interface. The second electrical interface can be configured to mechanically and electrically couple to a second connector of the first electrical device to transmit first data signals to the first electrical device and receive second data signals from the first electrical device. As an example, the second electrical interface can be similar or identical to electrical interface 115 of FIGS. 1-5. In some examples, the second connector of the first electrical device can be a 3.5 mm female TSR connector, and the second electrical interface can include a 3.5 mm male TSR connector.

Method 600 in FIG. 6 continues with an activity 630 of providing a transmittal mechanism. The transmittal mechanism can provide the second data signals to the receiving device. The receiving device can be similar or identical to receiving device 195 of FIG. 1. In some examples, the transmittal mechanism can be similar or identical to transmitter 416 of FIG. 4. In the same of different examples, the transmitter mechanism can be similar to or identical to an audio output connector 351 of FIGS. 3 and 5. In other examples, the transmittal mechanism can include transmitter 416 and audio output connector 351.

Next, method 600 of FIG. 6 includes an activity 635 of electrically coupling the transmittal mechanism to the second electrical interface. In some examples, the electrical coupling of transmittal mechanism to the second electrical interface can be similar or identical to the electrical coupling of transmitter 416 to electrical interface 115 and/or the electrical coupling of audio output connector 351 to electrical interface 115.

Method 600 of FIG. 6 further includes an activity 640 of providing at least one microphone. The at least one microphone can receive sounds and convert the sounds into the first data signals. In some examples, the at least one microphone can be similar or identical to microphone 417 of FIG. 4.

Method 600 in FIG. 6 continues with an activity 645 of electrically coupling the at least one microphone to the second electrical interface. In some examples, the electrical coupling of the at least one microphone to the second electrical interface can be similar or identical to the electrical coupling of microphone 417 to electrical interface 115.

In various embodiments, the order of activities 610 through 645 can be modified. For example, activities 640 and 645 can occur simultaneously with activities 610-620 and/or 625-635.

Although the invention has been described with reference to specific embodiments, it will be understood by those skilled in the art that various changes may be made without departing from the spirit or scope of the invention. For example, it will be readily apparent that electrical accessory 501 (FIG. 5) could include electrical interface 214 (FIG. 2). Furthermore, method 600 (FIG. 6) could include activities for providing a first coupling mechanism and a second coupling mechanism where the first coupling mechanism and the second coupling mechanism are similar or identical to coupling mechanisms 560 and 561 of FIG. 5. Additional examples of such changes have been given in the foregoing description. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the electrical accessory and method of providing the electrical accessory discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An electrical accessory configured to transmit one or more first data signals from a first electrical device to a receiving device, the electrical accessory configured to transmit second data signals to the first electrical device, the first electrical device comprising a first electrical connector and a second electrical connector, the electrical accessory comprising:
    a power acquisition unit configured to receive electrical power from an external power source;
    a first electrical interface electrically coupled to the power acquisition unit and configured to mechanically and electrically couple to the first connector to provide the electrical power to the first electrical device;
    a second electrical interface configured to mechanically and electrically couple to the second connector, the second electrical interface is configured to transmit the second data signals to the first electrical device and to receive the first data signals from the first electrical device;
    a transmittal mechanism electrically coupled to the second electrical interface and configured to provide the first data signals to the receiving device; and
    a first microphone electrically coupled to the second electrical interface and configured to receive sounds and convert the sounds into the second data signals.

2. The electrical accessory of claim 1, wherein:
the transmittal mechanism comprises:
    a radio frequency transmitter configured to wirelessly provide the first data signals to the receiving device.

3. The electrical accessory of claim 2, wherein:
the transmittal mechanism further comprises:
    an antenna.

4. The electrical accessory of claim 2, further comprising:
a holder configured to hold the first electrical device; and
a semi-rigid elongated portion configured to allow a position of the holder to be semi-permanently adjusted relative to a position of the power acquisition unit,
wherein:
    the semi-rigid elongated portion is further configured to radiate the first data signals received from the radio frequency transmitter.

5. The electrical accessory of claim 2, wherein:
the transmittal mechanism further comprises:
    a third electrical interface configured to mechanically and electrically couple to the receiving device.

6. The electrical accessory of claim 1, wherein:
the power acquisition unit comprises:
    a cigarette lighter adapter; and
    a deformable resilient member circumscribing a portion of the power acquisition unit.

7. The electrical accessory of claim 1, further comprising:
a holder configured to hold the first electrical device, the holder comprising the first electrical interface.

8. The electrical accessory of claim 7, wherein:
the holder further comprises:
    a base portion comprising the first electrical interface;
    at least one extension portion extending away from the base portion;
    at least one support configured to provide support to the first electrical device.

9. The electrical accessory of claim 8, wherein:
the at least one extension portion comprises:
    a first extension; and
    a second extension adjustably coupled to the first extension such that a distance between the base portion and the at least one support can be adjusted within a predetermined range.

10. The electrical accessory of claim 8, wherein:
the base portion further comprises:
    electrical device controls for at least partially operating the first electrical device.

11. The electrical accessory of claim 10, wherein:
the electrical device controls comprises a single button;
the single button is configured to begin and end a telephone call on the electrical device; and
the single button is further configured to signal to the electrical device to play, pause, fast forward, and rewind audio being played on the electrical device.

12. The electrical accessory of claim 1, wherein:
the first electrical interface comprises a thirty-pin connector; and
the second electrical interface comprises a TSR connector.

13. The electrical accessory of claim 1, wherein:
the transmittal mechanism comprises:
    a TSR output connector configured to provide the first data signals to the receiving device.

14. An electrical apparatus configured to couple to an electrical device, the electrical apparatus comprising:
    a cradle for holding the electrical device;
    a first coupling configured to transmit electrical power to the electrical device;
    a second coupling configured to transmit first data to the electrical device and receive second data from the electrical device;
    a first control configured to at least partially operate the electrical device;
    a cigarette lighter adapter electrically coupled to the first coupling;
    a gooseneck mechanically coupling the holder to the cigarette lighter adapter;
    a microphone electrically coupled to the second coupling and configured to provide the first data to the first coupling; and
    a transmitter electrically coupled to the second coupling, the transmitter is configured to transmit the second data from the electrical device to an external speaker system.

15. The electrical apparatus of claim 14, wherein:
the microphone is located at the holder.

16. The electrical apparatus of claim 14, wherein:
the microphone is located at the cigarette lighter adapter.

17. The electrical apparatus of claim 14, wherein:
the transmitter comprises a radio frequency transmitter.

18. The electrical apparatus of claim 14, further comprising:
one or more second controls configured to operate the transmitter; and
a display configured to display information related to the transmitter and the second data.

19. The electrical apparatus of claim 14, further comprising:
a TSR output connector;
a universal serial bus connector; and
a microphone input port.

20. The electrical apparatus of claim 14, wherein:
the first coupling comprises a thirty-pin connector; and
the second coupling comprises a TSR connector.

21. The electrical apparatus of claim 14, wherein:
the gooseneck is electrically coupled to the transmitter and comprises an antenna for the transmitter.

22. The electrical apparatus of claim 14, wherein:
the first control comprises a single button;
the single button is configured to begin and end a telephone call on the electrical device; and
the single button is further configured to signal to the electrical device to play, pause, fast forward, and rewind audio being played on the electrical device.

23. An electrical device configured to couple to a media device, the electrical device comprising:
a first coupling configured to transmit first data to the media device and receive second data from the media device;
a first control configured to at least partially operate the media device;
a microphone electrically coupled to the first coupling and configured to provide the first data to the first coupling;
a transmitter electrically coupled to the first coupling, the transmitter is configured to transmit the second data received from the media device to an external speaker system;
a first housing at least partially enclosing the transmitter, the first housing comprising a first coupling mechanism;
a cigarette lighter adapter configured to couple to an external electrical power source and configured to provide electrical power to at least the microphone, the transmitter, and the first control; and
a second housing at least partially enclosing the cigarette lighter adapter, the second housing comprising a second coupling mechanism,
wherein:
the first coupling mechanism is configured to couple to the second coupling mechanism such that the first housing is supported by the second housing.

24. The electrical device of claim 23, wherein:
the microphone is located at the first housing.

25. The electrical device of claim 23, wherein:
the microphone is located at the second housing.

26. The electrical device of claim 23, wherein:
the transmitter comprises a radio frequency transmitter.

27. The electrical device of claim 23, further comprising:
one or more second controls configured to operate the transmitter; and
a display configured to display information related to the transmitter and the second data.

28. The electrical device of claim 23, further comprising:
a TSR output connector;
a universal serial bus connector; and
a microphone input port.

29. The electrical device of claim 23, wherein:
the first coupling is a TSR connector.

30. A method of providing an electrical accessory, the method comprising:
providing a power acquisition unit configured to receive power from an external power source;
providing a first electrical interface such that the first electrical interface can be mechanically and electrically coupled to a first connector of a first electrical device;
electrically coupling the first electrical interface to the power acquisition unit;
providing a second electrical interface such that the second electrical interface can be mechanically and electrically coupled to a second connector of the first electrical device to transmit first data signals to the first electrical device and to receive second data signals from the first electrical device;
providing a transmittal mechanism such that the transmittal mechanism can provide the second data signals to a receiving device;
electrically coupling the transmittal mechanism to the second electrical interface;
providing a first microphone such that the first microphone can receive sounds and convert the sounds into the first data signals; and
electrically coupling the first microphone to the second electrical interface.

\* \* \* \* \*